United States Patent
Petroff

(10) Patent No.: US 11,100,601 B2
(45) Date of Patent: Aug. 24, 2021

(54) VEHICLE DISPATCHING METHOD AND SYSTEM

(71) Applicant: Autonomous Solutions, Inc., Petersboro, UT (US)

(72) Inventor: Thomas M. Petroff, Gibsonia, PA (US)

(73) Assignee: AUTONOMOUS SOLUTIONS INC., Petersboro, UT (US)

(*) Notice: Subject to any disclaimer, the term of this patent is extended or adjusted under 35 U.S.C. 154(b) by 352 days.

(21) Appl. No.: 15/458,515

(22) Filed: Mar. 14, 2017

(65) Prior Publication Data
US 2017/0186125 A1   Jun. 29, 2017

Related U.S. Application Data

(60) Continuation of application No. 14/099,495, filed on Dec. 6, 2013, now abandoned, which is a division of
(Continued)

(51) Int. Cl.
*G01C 21/34* (2006.01)
*G05D 1/02* (2020.01)
(Continued)

(52) U.S. Cl.
CPC ........... *G06Q 50/28* (2013.01); *G01C 21/343* (2013.01); *G01C 21/3492* (2013.01);
(Continued)

(58) Field of Classification Search
CPC ............... G06Q 30/00; G06Q 30/0206; G06Q 30/0283; H04W 4/40; H04W 24/02;
(Continued)

(56) References Cited

U.S. PATENT DOCUMENTS

| 6,351,697 B1* | 2/2002 | Baker | G01G 19/08 |
| | | | 342/357.24 |
| 2003/0069680 A1* | 4/2003 | Cohen | G06Q 10/0631 |
| | | | 701/50 |

(Continued)

OTHER PUBLICATIONS

"Dynamic programming determines optimum catalyst life strategy," by Kuschcinski, Gray, Sep. 2, 2002 (Year: 2002).*

*Primary Examiner* — George Chen
*Assistant Examiner* — Brian Adams Heflin
(74) *Attorney, Agent, or Firm* — Sanders IP Law

(57) ABSTRACT

Vehicle dispatch system includes upper stage unit, lower stage unit and interface communication unit. The upper stage unit, configured to generate vehicle schedules, is communicatively connected to the interface communication unit. The lower stage unit, communicatively connected to the upper stage unit and the interface communication unit, has two storage units and a control unit. The first storage unit stores in a state representation multiple possible states having multiple possible actions. The control unit, which receives the schedule as a state representation, is configured to simulate states during an episode by selecting a state action and determining a reward value. The second storage unit stores the reward value and has a policy linked to one possible action for each state. The interface communication unit, operable to receive and transmit vehicle communications, is configured to access the policy and its associated action and communicate the action to a vehicle.

8 Claims, 4 Drawing Sheets

Related U.S. Application Data application No. 12/164,740, filed on Jun. 30, 2008, now Pat. No. 8,626,565.

(51) Int. Cl.

| | |
|---|---|
| *G06Q 10/06* | (2012.01) |
| *G08G 1/00* | (2006.01) |
| *G05D 1/00* | (2006.01) |
| *G06Q 50/28* | (2012.01) |
| *G06N 20/00* | (2019.01) |
| *G06Q 10/02* | (2012.01) |
| *G06Q 50/30* | (2012.01) |
| *G06Q 10/04* | (2012.01) |

(52) U.S. Cl.
CPC ......... *G05D 1/0088* (2013.01); *G05D 1/0221* (2013.01); *G05D 1/0291* (2013.01); *G06N 20/00* (2019.01); *G06Q 10/02* (2013.01); *G06Q 10/04* (2013.01); *G06Q 10/06312* (2013.01); *G06Q 50/30* (2013.01); *G08G 1/00* (2013.01); *G08G 1/202* (2013.01); *G08G 1/22* (2013.01); *G05D 2201/0212* (2013.01); *G06Q 2240/00* (2013.01)

(58) Field of Classification Search
CPC ....... H04W 24/08; G06N 20/00; G06N 5/043; G06N 7/005; G05D 1/0227; G05D 1/0238; G05D 1/028; G10K 2210/3041; G05B 2219/32334; G05B 2219/34082; G05B 2219/40499; G07C 2009/00849; G06F 16/27; G06F 16/7837; G06F 16/951; G06F 21/10

See application file for complete search history.

(56) References Cited

U.S. PATENT DOCUMENTS

| | | | |
|---|---|---|---|
| 2003/0074338 A1* | 4/2003 | Young | G05B 13/027 706/15 |
| 2004/0073764 A1* | 4/2004 | Andreasson | G06F 12/0253 711/170 |
| 2005/0197876 A1* | 9/2005 | Benda | G06Q 10/04 705/333 |
| 2006/0155664 A1* | 7/2006 | Morikawa | G06N 20/00 706/47 |
| 2007/0203871 A1* | 8/2007 | Tesauro | G06N 3/006 706/53 |
| 2020/0234197 A1* | 7/2020 | Osogami | G06N 20/20 |

\* cited by examiner

VEHICLE DISPATCHING METHOD AND SYSTEM

CROSS-REFERENCE TO RELATED APPLICATIONS

The present invention is a continuation of U.S. patent application Ser. No. 14/099,495, filed Dec. 6, 2013 and entitled VEHICLE DISPATCHING METHOD AND SYSTEM, which is a divisional of U.S. patent application Ser. No. 12/164,740, filed on Jun. 30, 2008 and entitled VEHICLE DISPATCHING METHOD AND SYSTEM, now U.S. Pat. No. 8,626,565, both of which are incorporated by reference as though set forth herein in their entirety.

TECHNICAL FIELD

The present invention relates to a vehicle dispatching method and system. Specifically, the present invention is for dispatching multiple vehicles operating in a work area.

BACKGROUND

In many different industries, such as warehousing, shipping or mining, and for different applications (e.g. material handling, fleet management, delivery, police and emergency vehicles, military, etc.), a plurality of vehicles must travel to and from multiple destination points. Due to vehicle limitations, such as cargo capacity or speed, vehicles must make many trips over a given period of time to accomplish a given objective, such as continuously transporting goods or materials to the desired destination on time. Dispatching often aids in efficiency. Vehicles and events in a work area are monitored so that vehicles can be dispatched when an event occurs that affects efficiency. For example, the object may be to maximize the amount of material hauled while minimizing operational costs. In another example, the object may be to maximize the number of deliveries over a period of time. Achieving these objectives (and therefore efficiency) becomes increasingly difficult as the number of vehicles and the number of destinations increase.

Vehicle dispatch systems dealing with multiple vehicles have been implemented in the past with limited success due to poor selection of routes or vehicles or solutions based on localized parameters, thereby limiting their applicability as generalized solutions, for example.

Linear programming methods have been used to establish a schedule for vehicles to follow, but the schedules have not been adapted to address the constantly-changing environment in real time. Other commonly-used vehicle dispatching systems use a "greedy" local search method to select a vehicle for the next task by implementing heuristic rules that select vehicles on a "first come first served" or "minimize wait time" basis. Even under this system, the set schedule must be maintained, again failing to take account of uncertain and constantly changing environments.

Thus, there exists a need for an efficient vehicle dispatching method and system that can be used to advantage in uncertain environments. This invention addresses this need in the art as well as other needs, which will become apparent to those skilled in the art from this disclosure.

SUMMARY OF THE INVENTION

One embodiment of a vehicle dispatch system according to the present invention may comprise an interface communication unit, an upper stage unit, and a lower stage unit. The interface communication unit is operable to receive and transmit communications from vehicles. The upper stage unit is communicatively connected to the interface communication unit and configured to generate a schedule for the vehicles. The lower stage unit is communicatively connected to the upper stage unit and the interface communication unit, and has a control unit that receives the schedule as a state representation, a first storage unit for storing a plurality of states that are possible in the state representation, and a second storage unit. Each possible state has a plurality of possible actions. The control unit is configured to simulate the states during an episode by selecting an action of the state and determining a reward value for the selected action. The second storage unit stores the reward value for each action and has a policy linked to one of the possible actions for each state. The interface communications unit is configured to access the policy and the action linked to the policy and communicate the action to one or more of the vehicles.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION

A vehicle dispatch system 1 and method 30 according to embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The vehicle dispatch system 1 or method 30 comprises a combination of linear programming and reinforcement learning to provide dynamic vehicle dispatching solutions. The reinforcement learning aspect of the invention "learns" from the consequences of actions taken within an environment (such as work area 8, for example), thereby permitting the best action to be "learned" over the course of thousands of simulations. Generally, the reinforcement learning of the present invention includes a decisionmaking agent interacting with the environment in order to maximize a reward. The reinforcement learning, via the decisionmaking agent, identifies characteristics of the environment's state and selects actions, preferring actions that in the past have been effective in maximizing the reward. The present invention includes a value function that is used to construct better decisionmaking policies based on a value of the rewards accumulated over time. In vehicle dispatching, continuous decisionmaking produces a sequence of decisions in which each decision defines options available when making future decisions. The present invention provides a vehicle dispatch method 30 and system 1 that can cycle through multiple sequences of decisions via simulation to learn or discover the best decisions for producing the right rewards (i.e., optimum results in vehicle dispatching). The simulation of the present invention can include both trial and error learning and/or deliberate planning as well as elements of randomness to learn or discover the best decisions to maximize rewards and longterm value leading to the optimum results in vehicle dispatching. One advantage the present invention may have over conventional dispatching is that it allows reinforcement learning to be applied to continuous actions taking place over time where time may be considered to be infinite for all practical purposes. In the past, reinforcement learning could not be applied to uncertain environments having continuous actions over a time continuum without fixed intervals. Often, the conventional means would be limited to a mere sampling of the actions at fixed time intervals. The inventor has identified this problem and has fashioned a novel solution in which a time continuum is a factor, but where nonetheless reinforced decisions can be made automatically whenever a dispatch is needed, as explained below.

Figure 1:
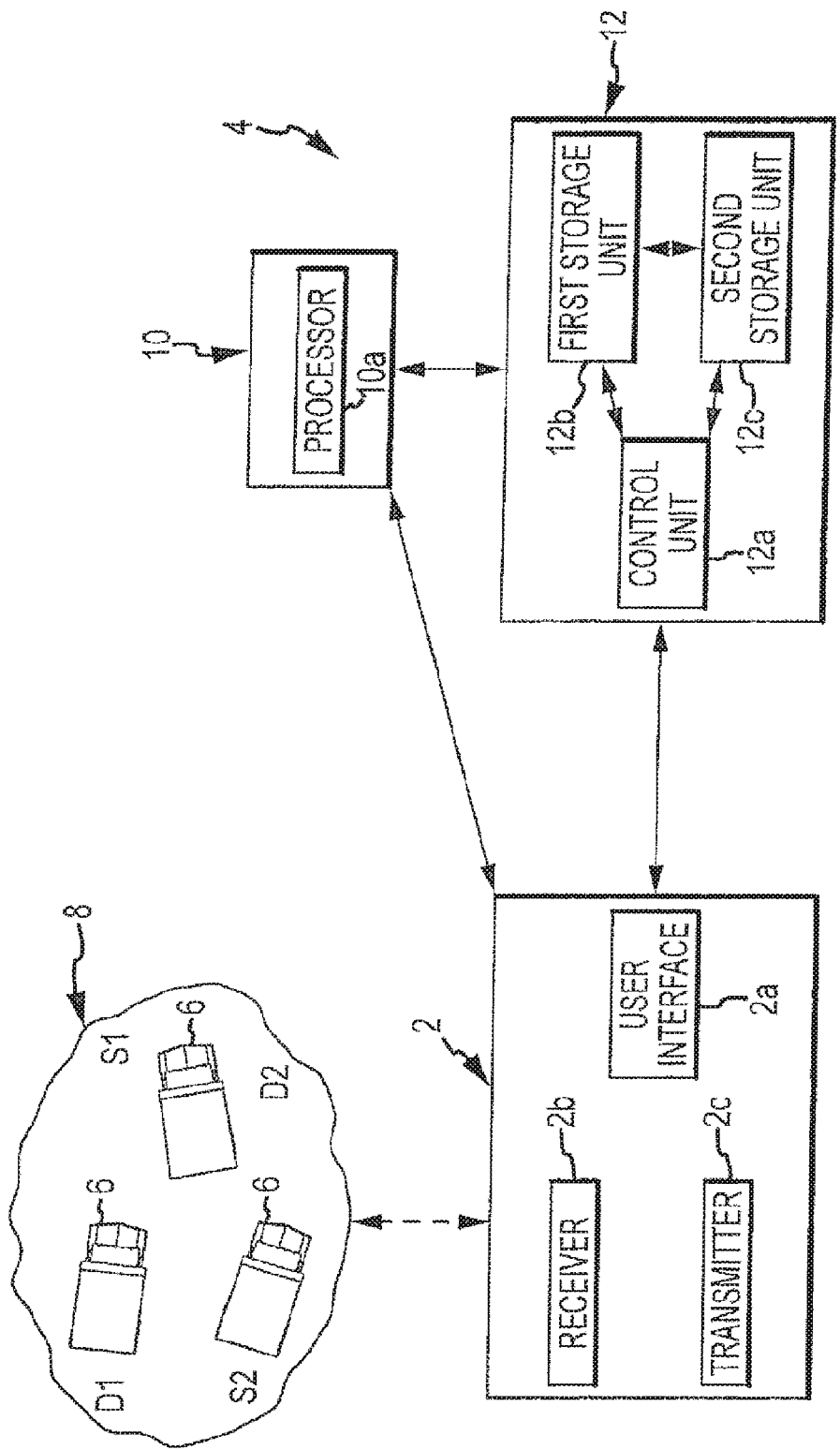
FIG. 1 is a schematic diagram of a vehicle dispatch system or method according to one embodiment of the present invention.

While the present invention in its various embodiments may be described as vehicle dispatch system 1 and vehicle dispatch method 30, the detailed description of the invention will begin with a general description of vehicle dispatch system 1. Referring initially to FIG. 1, vehicle dispatch system 1 may comprise an interface communication unit 2 and a multistage unit 4 for communicating with and controlling vehicles 6 that may be autonomous or substantially autonomous, such that at least a portion of the vehicle's 6 functions may operate under the control of a computer, processor and/or control unit.

The interface communication unit 2 includes communication equipment to receive information from and transmit information to multiple vehicles 6 operating within work area 8. The vehicles 6 are preferably equipped with communication equipment (not shown) to receive and transmit information. Interface communication unit 2 monitors and controls vehicle 6 operating in the work area 8. Where the vehicles 6 are autonomous or substantially autonomous, the interface communication unit 2 controls and monitors the multiple autonomous vehicles 6, preferably in wireless communication with vehicle 6, but this is not required. The interface communication unit 2 may be maintained at a location separate and remote from the vehicles 6, where interface communication unit 2 provides a control center for a user to monitor and control multiple vehicles 6.

Interface communication unit 2 comprises user interface 2a that may be used to configure, for example, a mission of the vehicles 6, a path to be taken by the vehicles 6, or individual tasks of the vehicles 6. Preferably, the interface communication unit 2 wirelessly communicates with the vehicles 6 via a receiver 2b and transmitter 2c, for example, from the location remote from the work area 8 in which the vehicles 6 operate. The interface communication unit 2 can be operated via a control unit (not shown), which can run software such as the Mobius™ control software from Autonomous Solutions, Inc.™, for example. Such software allows the user to configure missions or paths for autonomous vehicles 6, for example. The software of the interface communication unit 2 further allows the user to select vehicle 6 from among many and impart instructions to the selected vehicle 6 to perform various tasks desired by the user. The software and hardware of the interface communication unit 2 are used to send instructions to the vehicles 6.

In a mining application, for example, the user can safely operate large vehicles 6, for example, at locations remote from the dangerous or dynamic work area 8. The interface communication unit 2 provides for improved monitoring and control of vehicles 6 because the interface communication unit 2 allows relatively few users to monitor and control many vehicles 6.

As stated above, work area 8 may present a dynamic environment due to the presence of multiple vehicles 6 with different sources, destinations and paths. Thus, in the embodiment shown in FIGS. 1 and 2, the work area 8 comprises a plurality of source locations S1, S2 and a plurality of destination locations D1, D2 along paths, routes or legs of a round trip. The vehicles 6 travel to and from the source locations S1, S2 and the destination locations D1, D2.

Given the attributes of work area 8, the user interface 2a of the interface communication unit 2 may be configured to provide general operational requirements to the multistage unit 4. The general operational requirements may comprise constraints in the work area 8, such as material blending requirements, and minimum and maximum capacities of source locations S1, S2 and destination locations D1, D2. The general operational requirements may also comprise vehicular constraints, such as maximum and minimum loads and maximum and minimum velocities.

Now, multistage unit 4 of vehicle dispatch system 1 will be discussed. The multistage unit 4 creates a schedule and optimizes the schedule as will be described in more detail below. The multistage unit 4 of the vehicle dispatch system 1 comprises an upper stage unit 10 and a lower stage unit 12. The upper stage unit 10 comprises a processor 10a that receives data from the user interface 2a of the interface communication unit 2. The user at the interface communication unit 2 may use the user interface 2a to input various constraints, including the general operational requirements, and optimization requests into the processor 10a of the upper stage unit 10. The upper stage unit 10 and the lower stage unit 12 are communicatively connected to each other and to the interface communication unit 2. For example, in an embodiment described herein, the upper stage unit 10, the lower stage unit 12 and the interface communication unit 2 are wirelessly connected to each other and are in separate locations remote from one another. It will be apparent to one of ordinary skill in the art from this disclosure that, the upper stage unit 10 and the lower stage unit 12 may form an integral multistage unit 4 in which all of the functions, characteristics, identities, etc., described herein for the upper stage unit 10 and the lower stage unit 12 are performed by a single unit. Consequently, the configuration of the multistage unit 4 should not be regarded as limited to the particular configuration shown and described herein. In another embodiment, the multistage unit 4 forms a section of the interface communication unit 2 to form an integral control system. In one embodiment, the upper stage unit 10 with the processor 10a utilizes programming (i.e., linear programming) to develop the schedule for the vehicles 6 to operate among and between the source locations S1, S2 and destination locations D1, D2.

Figure 3:
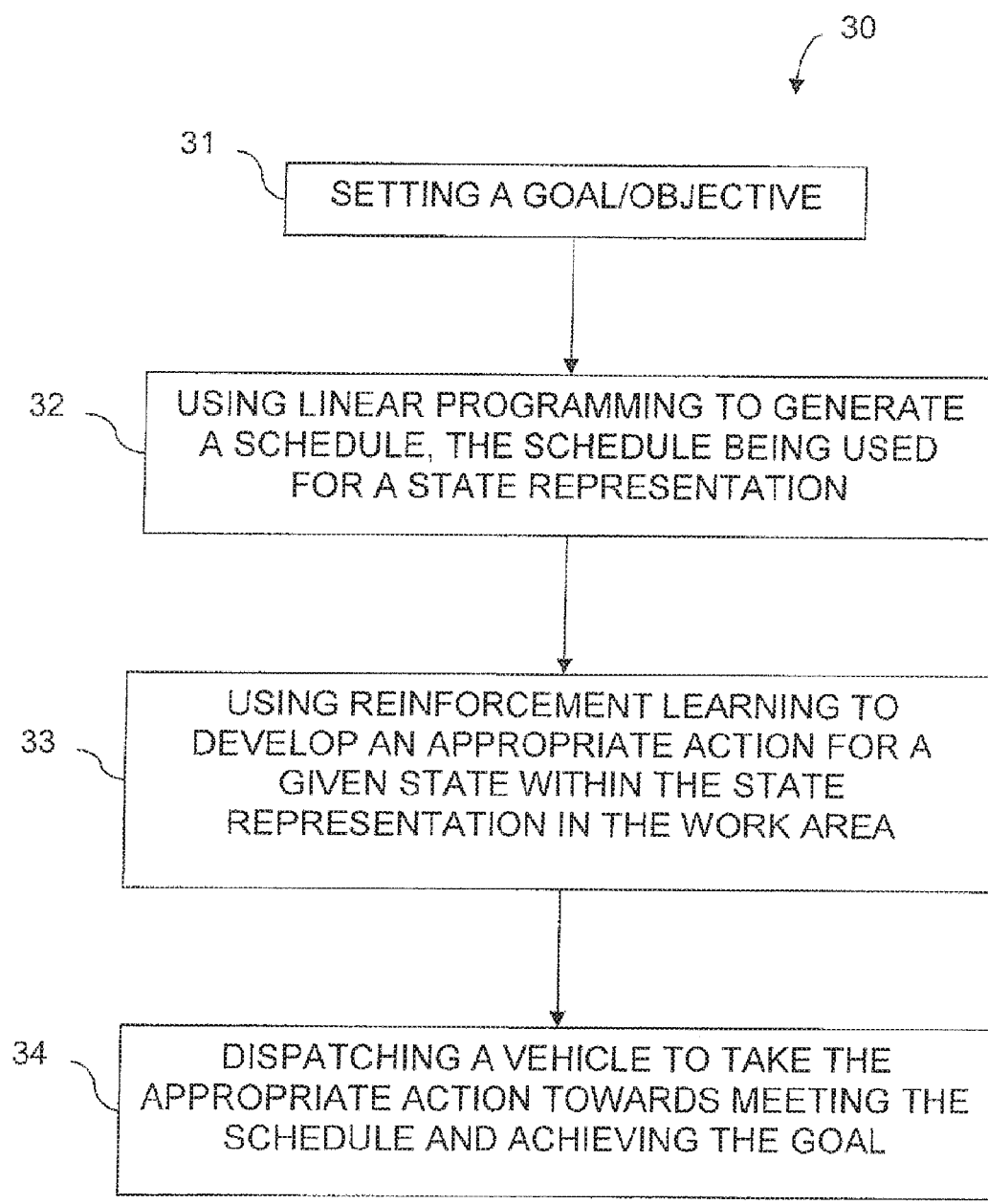
FIG. 3 illustrates a method of vehicle dispatching according to the present invention.

Having briefly described the vehicle dispatch system 1, the vehicle dispatch method 30 will now be described. The present invention advantageously provides vehicle dispatch method 30 to communicate with many vehicles 6 operating among and between the source locations S1, S2 and destination locations D1, D2 to achieve one or more goals or objectives, e.g., maximizing the amount of material hauled, minimizing delivery time, etc. Thus, method 30 schematically illustrated in FIG. 3 comprises setting 31 the goal using 32 linear programming to generate the schedule, the schedule being used for a state representation; using 33 reinforcement learning to develop an appropriate action for a given state within the state representation in the work area 8; and dispatching the vehicle 6 to take the appropriate action towards meeting the schedule and achieving the goal. A significant advantage of the present invention is that the schedule, which is developed to achieve the goal(s), may be continually optimized by simulating possible actions taken during the course of implementing the schedule through reinforcement learning. Recognizing that the method 30 is dynamic and iterative, the steps of the method 30 should not be viewed as being limited to being performed in any particular order.

As stated above, method 30 may comprise setting 31 the goal. One goal may be to haul as much material to the destination locations D1, D2 as possible. However, achieving this goal may be constrained by the fact that, often, not all source and destination locations S1, S2, D1, D2 have the same type of material. In addition, percentage constraints may also be a factor since a certain percentage of each material type must be carried to the destination locations D1, D2 over a specified time period.

After setting 31 the goal, the next step of the method 30 may comprise using 32 linear programming to generate the schedule to achieve the goal(s). The linear programming's schedule can take a number of different forms. For example, the schedule can assign the number of loads that should be picked up at each source location S1, S2 and dropped off at each destination location D1, D2 or can assign the number of trips that should be taken along each path, e.g., the path from S2 to D1. However, the method 30 does not stop there because using linear programming does not work well for dynamic environments, even when the linear program is rerun. Recognizing the limitations of using linear programming, as explained in more detail below, the method 30 of the present invention uses dynamic methods to allow the vehicles 6 to be dispatched to meet the schedule developed by the linear programming.

While linear programming can generate the schedule, that schedule does not take into account the changes that are constantly occurring in the work area 8 that will determine whether the vehicles 6 will be able to keep to the schedule. In dynamic work area 8, such as a mining pit, the environment changes frequently and often dramatically. For example, roads change: Roads can be closed due to obstacles and stalled vehicles; roads are reopened as disruptions are resolved; and roads can be rerouted due to movement of material during the course of mining. Also, the number and identity of available vehicles 6 change, too, due to vehicle 6 breakdowns and required maintenance. Moreover, source locations, S1, S2 and/or destination locations D1, D2 may become unavailable, etc. Linear programming cannot account for these problems in real time; nor do greedy local search methods that rely on a heuristic and therefore do not explore other options or possible actions obviating a global optimum solution.

However, by using reinforcement learning in combination with linear programming in a novel way, the method 30 of the present invention provides a way to anticipate these situations and set a policy that can be followed when such situations arise. Simulation through reinforcement learning is used to develop the policy for the given situation and then to associate an appropriate action with the policy to lead to optimal results. The appropriate action may be one that is the most efficient or otherwise preferred or it may just be considered appropriate under the circumstances. Thus, a globally optimal policy can be determined so that the schedule can be met. Implementing multiple policies pertaining to actions in accordance with the method 30 of the present invention causes the optimal schedule to be very close to the schedule generated when using 32 linear programming.

The schedule generated by using 32 linear programming is used in the reinforcement learning step, which in one embodiment, may comprise a reinforcement learning algorithm. The schedule is input into the reinforcement learning algorithm as the state representation, S, as is described in more detail below. Thus, reinforcement learning may be used to operationalize the schedule through intensive simulation and thereby create policies for the vehicles 6 to follow, such as by developing the appropriate action for the state s within the state representation S in the work area 8. Through simulation, the reinforcement learning algorithm creates and improves policies for possible environmental states that could occur in the work area 8.

Preferably, the state representation S is set up in such a way that it can handle many different types of vehicle dispatching problems. In an embodiment described herein, the reinforcement learning algorithm allows many vehicle dispatching problems, such as breakdown, maintenance, road closures, obstacles, etc., to be considered in determining the optimum dispatch decision for the vehicles 6 in the work area 8. Ultimately, the more vehicle dispatching problems considered, the more complex the scenarios, and, thus, the more time involved in determining a solution. In the reinforcement learning step 33 a policy is developed for each possible environmental state in the work area 8 based on at least a reward value and time. An actual state in the work area 8 is then associated with one of the possible environmental states and the appropriate action (e.g., preferred action) associated with the policy for the associated possible environmental state is accessed.

Armed with the appropriate action, method 30 further comprises dispatching 34 the vehicle 6 to take the appropriate action towards meeting the schedule and achieving the goal. Vehicle dispatching 34 comprises sending instructions to vehicle 6 to take the appropriate action at critical junctures that occur in work area 8. The present invention aids in continuously sending instructions to vehicles 6 to go from source location S1, S2 to destination location D1, D2 in a way that may minimize idle time and maximize material throughput, for example. Dispatching 34 may designate the vehicle 6 route between locations S1, S2, D1, D2 to take between locations and may occur continuously. In the case of autonomous vehicle 6, dispatching 34 may comprise sending instructions to take the appropriate action directly to the vehicle 6 via wireless communication through the vehicle dispatch system 1. In an embodiment for vehicles 6 operated teleremotely, dispatching 34 may comprise sending such instructions to the teleremote operator. In an embodiment for manned vehicles 6, dispatching 34 may comprise sending such instructions to the vehicle 6 operator directly (e.g., via radio communication).

The method 30 may be further explained with reference to the following example. Work area 8 of the present example consists of two source locations S1, S2 and two destination locations D1, D2, with the segments in between being of various lengths. It takes 2.5 minutes to load at S1 and 1.8 minutes to load at S2. It takes three minutes to unload at D1 and four minutes at D2. In this example, loads from S2 can only be unloaded at D1 because they are of the same material type and loads from S1 are only able to be unloaded at D2. This example uses five vehicles 6. Each vehicle has an average velocity of 10 m/s and a haul capacity of 100 tons. Thus, in the context of this example, setting 31 the goal may comprise maximizing the loads delivered from S2 to D1 and S1 to D2.

The linear programming of the vehicle dispatch system 1 or method 30 generates the schedule, which may be a simple, optimal abstract schedule. An example of the schedule that defines the number of trips to be traveled along each path between source locations S1, S2 and destination locations D1, D2 is given in Table 1.

TABLE 1

Linear Program Schedule

| Edge | Quota |
|---|---|
| S1 to D2 | 15 |
| S2 to D1 | 20 |
| D1 to S1 | 0 |
| D1 to S2 | 20 |
| D2 to S1 | 15 |
| D2 to S2 | 0 |

Instead of using a greedy local search solution, for example, to generate dispatches that try to maintain the linear programming's schedule—using techniques such as first come first served, minimize wait time, etc.—method 30 of the present invention uses 33 reinforcement learning to operationalize the schedule (e.g., developing the appropriate action for state(s) in work area 8). In one embodiment, using 33 reinforcement learning comprises using a Monte Carlo reinforcement learning algorithm.

An example of a Monte Carlo reinforcement learning algorithm for this embodiment is shown below.
initialize, for all s∈S, a∈A(s)
  Q(s, a)←0
  π(s)←0
  Returns(s, a)←empty list
Repeat until no changes in policy:
  Get start state s
  a←π(s)
  For each pair s, a appearing in the episode:
    R←applyAction(s, a)
    Append R to Returns(s, a)
  For each s, a pair in Returns:
    Q(s, a)←Q(s, a)+
      α·{[R+γ·Q(s', a')]−Q(s, a)}
    where s', a' are the
    next state and next action in the episode
  π(s)←argmax$_a$Q(s, a)

In the reinforcement learning algorithm shown above, S is the set of all states s, and A is the set of all actions a in state s. Q(s,a) is a policy value function for state s given action a. (s) is the policy, i.e., the action that should be taken, for state s. An episode is one run of the simulation. R is the reward for taking action a in state s. The goal of the reinforcement learning is to maximize the reward R to both identify the appropriate (e.g., best) action for each state and designate that action as the policy n(s) for that state. It will be apparent to one of ordinary skill in the art from this disclosure that the reinforcement learning algorithm can take various forms, and that reinforcement learning techniques, such as SARSA, Q-learning and temporal difference learning, can be used.

The reinforcement learning algorithm uses the output of the linear programming (i.e., the schedule) to create the state representation, S. In one embodiment, the state representation S may be characterized as a simple table or array containing the possible states s of the work area 8, such as that shown in Table 1. The state representation S may be used in reinforcement learning as an easy way to track the states s of the work area 8. A state array takes each of the possible states s of the work area 8 (e.g., from Table 1) and places them in a discrete location in the state array. For learning purposes, a Q table is created. The Q table links with the state array to facilitate final decisionmaking and the policy π for state s is linked to a policy value Q in the Q table. The Q table consists of the value (e.g., the policy value) for each possible action a at each state s in the state representation S. Learning takes place by assigning reward R (e.g., reward value) based on the results from the action a and propagating rewards through all of the states s by adjusting the policy values in the Q table. The rewards R are a factor in determining whether the action a results in the policy π(s) for the state s. The reinforcement learning tries to maximize the reward R by continuously running simulations. The action a in given state s that results in the maximum possible value of Q becomes the policy π for that given state s and the action a is the appropriate (e.g., preferred action). The policy π is linked to the appropriate action a which produces the maximum value of Q. If during a subsequent simulation the reinforcement learning technique attains policy value Q greater than previously achieved, the policy value in the Q table for the corresponding action a in the state s is adjusted and the action a that resulted in the greater policy value Q is newly associated with the policy π. To determine the policy π for a state s, the state's discrete location in the state array is found. The index in the array is then used to locate the appropriate element in the Q table. The action a in the Q table with the best policy value Q becomes the policy π for that state s. Once learning is complete, the action resulting in the policy π for the given state s of the work area 8 is communicated to vehicle 6, thereby dispatching 34 the vehicle 6 to take the appropriate action towards meeting the schedule and achieving the goal.

Now that the method 30 has been explained in general, embodiments of the method 30 demonstrating how using reinforcement learning can be used to modify state representation S will now be explained. In the embodiment shown in FIG. 2, when vehicles 6 are at destination location D1, D2, decisions need to be made about where the vehicles 6 should go next. There are two possible decisions: go to S1 or S2. In the schedule of this embodiment shown in Table 1, there are 20 states allocated for traveling from D1 to S2. While the reinforcement learning technique proceeds with learning, it is possible for more trips to be taken along the path other than what the linear programming's schedule suggests. As an example, a buffer of two may be added to the state representation S, increasing the possible states from D1 to S2 from 20 to 22 states. If more than 21 trips are made on this path, the same state index is returned as would be returned for 21 trips. This is done because exceeding the number of trips suggested by the linear programming is suboptimal. To represent all of these states and how they influence each other, the number of trips for each path are all multiplied together. In this example, where two actions are possible at each state, the Q table is twice the size of the state space. Equation (1) shows a calculation of the number of states for any given problem, where n is the number of trips and n, is the number of trips to take at the ith trip.

$$|S|\Pi_{i=1}^{n}(n_i 2) \tag{1}$$

The size of the state array grows as the number of source locations S1, S2, destination locations D1, D2, and vehicles 6 grow. To effectively deal with large state spaces, quantization can reduce the number of states. The trips along the paths can be quantized so state s is not needed for every single trip. Another way to reduce the state space is the use of function approximation, rather than the use of the state array. A TD-Gammon neural network is an example in which states are effectively managed through function approximation.

As stated above, once the state space representation S has been created from the linear programming's schedule, learning can begin. Learning takes place through simulation. Simulation allows learning to occur much faster than it would in real-time. For example, on a 2 GHz Pentium M Processor, simulation runs approximately 5,000-30,000 times faster than real-time. Thus, the validity of learning through simulation before applying the learned policy in the real world is evident. The variation in speed occurs because simulation runs slower as the system becomes more complex.

Reinforcement learning takes place by choosing action a each time a request is simulated and by observing the results of the action a via policy value function Q(s,a), the policy value Q and/or the reward R. In one embodiment, no rewards are given until the simulation time has elapsed, i.e., the episode is complete. In one embodiment, a negative reward is given, although other results are also possible. An equation representing this negative reward for the embodiment is shown in equation (2) below.

$$R = TDS - TTP \quad (2)$$

The negative reward R is the difference between the tons that are hauled during simulation in the episode TDS from the total tons possible TTP calculated by the linear programming. Generally, the linear programming slightly overestimates the number of tons that can be unloaded because the linear programming bases TTP on the total tons removed from source location S1, S2; in contrast, the reinforcement learning algorithm determines the total tons unloaded at destination location D1, D2 during the simulations. Thus, implementing the schedule, either in real-time or through simulation deviates from the result calculated by the linear programming.

The reward R is then propagated back through the states visited during the episode, i.e., completed simulation run, using equation (4) that deals with time. Thus, the vehicle dispatch system 1 and method 30 learns what actions lead to the best reward. In many reinforcement learning applications, action decisions occur at fixed time intervals. A general value update equation, such as equation (3), is sufficient in applications where fixed time intervals are acceptable. However, in vehicle dispatching for uncertain environments, fixed time intervals are rare and state changes do not occur at a fixed frequency. That is, requests, action taking and decisionmaking happen continuously and at irregular intervals. The present invention advantageously factors time into the reinforcement learning (equation (4)) so that action decisions can be made and vehicles can be dispatched when needed, not at predetermined intervals. In the following equations, s' is the state occurring after state s, and a' is the accompanying next action. t(s) is the elapsed time in the episode given state s.

$$Q(s,a) = Q(s,a) + \alpha \times [\gamma \times Q(s',a') - Q(s,a)] \quad (3)$$

$$Q(s,a) = Q(s,a) + \alpha \times [\gamma^{[t(s')-t(s)]} \times Q(s',a') - Q(s,a)] \quad (4)$$

Thus, with equation (4), the policy value Q for action a in any given state s is represented as policy value function Q(s,a) that includes the time between states in the update.

As can be seen from the reinforcement learning algorithm and equation (4), to determine the value Q for an existing state s and action a, the subsequent state s' and subsequent action a' in the episode are considered along with the current state s and action a. Furthermore, the elapsed time in the episode at the existing state t(s) and the elapsed time in the episode at the subsequent state t(s') are used in the policy value function Q (s,a) to determine the policy value Q.

Figure 4:
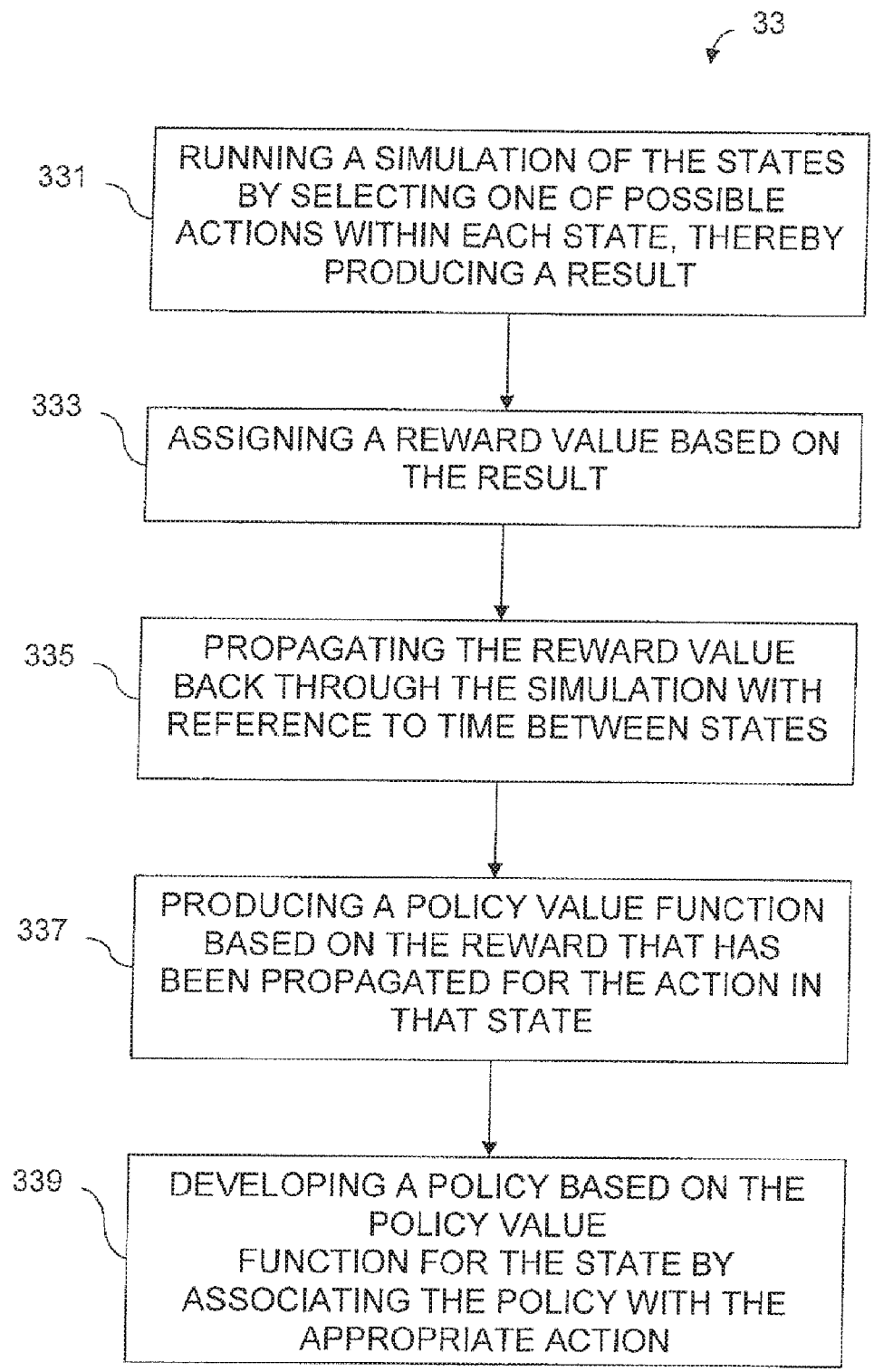
FIG. 4 illustrates the reinforcement learning step of the method of vehicle dispatching.

Thus, in the embodiment illustrated in FIG. 4, the step of using 33 reinforcement learning to develop the appropriate action for state(s) in the work area 8 may comprise running 331 a simulation of the states by selecting one of possible actions within each state, thereby producing a result; assigning 333 the reward value based on the result; propagating 335 the reward value back through the simulation with reference to time between states; producing 337 the policy value function based on the propagating 335; developing 339 the policy based on the policy value function for the state by associating the policy with the appropriate action.

In yet another embodiment, an element of randomness may be added to the simulations performed by the reinforcement learning. The randomness in the reinforcement learning strengthens the policies r developed and results in more efficient and beneficial vehicle dispatching decisions. Vehicle dispatching encounters many disturbances. For example, vehicles 6 break down, roads go out of operation, source and destination locations S1, S2, D1, D2 go out of operation due to breakdowns or changes in location, etc. The present invention is most advantageous in that it addresses these real-world problems during simulation. Thus, the vehicle dispatching system 1 or method 30 may develop the best policy π to follow for the given environmental state of the work area 8 and is well prepared for real-world events when they occur in the work area 8.

Specifically, reinforcement learning addresses real-world problems, i.e., disturbances, by introducing disturbances or entropy into the simulation and learning the best action to take when the disturbances or entropy occur. An example of learning from disturbances is where, during the simulation, the best or preferred action a, i.e. the action a in the state s with the (maximum) policy value Q, is not selected. That is, the reinforcement learning learns the consequences of not selecting the best action and further develops the policies n-based on the selections. Additionally, the reinforcement learning technique may discover that selecting action a that is not the best for state s may reveal, over the course of simulation, better actions a to take for other states s. The present invention provides flexibility in the reinforcement learning method to explore numerous possibilities through simulation to arrive at the best action a for given situation or state s. Disturbances may also occur where the number of vehicles 6 operating in the work area 8 is reduced (to simulate maintenance or a breakdown of the vehicle 6) or increased (to simulate vehicles 6 coming back online). Still other disturbances may occur where one or more source locations S1, S2 or destination locations D1, D2 are removed or added to simulate an area closure or reopening. The reinforcement learning technique learns from these disturbances so that the best action a is selected when such a disturbance occurs in the work area 8.

In another embodiment, adding a simple look-ahead search in the Q table may improve performance. The look-ahead search may be implemented to better determine the policy π each time a dispatch request is received and the appropriate action must be generated. The look-ahead search is performed to determine the wait time once the vehicle 6 arrives at its next destination D1, D2. The route that minimizes wait time and still meets the requirements of the schedule can be chosen.

Having described the method 30, a configuration for vehicle dispatch system 1 of the present invention will now be explained. In vehicle dispatch system 1 shown in FIG. 1, the upper stage unit 10 performs the linear programming. The linear programming of the upper stage unit 10 uses an optimization function to maximize the total number of tons hauled. The linear programming also uses equations to account for environmental and vehicular constraints, such as path information, number of vehicles 6, vehicle velocities and capacity, any material constraints, time limitations, etc. The processor 10a of the upper stage unit 10 performs the processing of the linear programming. In one embodiment, the processor 10a receives the above-mentioned optimization function and equations for the constraints from the interface communication unit 2. In the configuration for the vehicle dispatch system 1 shown in FIG. 1, the lower stage unit 12 implements the reinforcement learning method. In one embodiment, the state array having the states s of the state representation S is stored in a memory or storage unit, such as a first storage unit 12b. The Q table is stored in another memory or storage unit, such as a second storage unit 12c. The first and second storage units 12b and 12c are linked to each other and are both linked to the control unit 12a. Other arrangements for storage and control units are possible. In implementing method 30, the control unit 12a collects the necessary information from the state array in the first storage unit 12b, processes the information via the simulation of the reinforcement learning, and delivers the results to the Q table stored in the second storage unit 12c. In addition, when an environmental state exists in the work area 8 and vehicle 6 needs instructions from the interface communication unit 2, the interface communication unit 2 instructs or requests the control unit 12a to provide the appropriate action a for the state s. Specifically, the interface communication unit 2 and the lower stage unit 12 collaborate to associate the particular environmental state of the work area 8 with the equivalent state s in the state array in the first storage unit 12b. The control unit 12a calls the policy π associated with the (maximum) policy value Q for the state s and action a found in the second storage unit 12c. Once obtained by the control unit 12a, the interface communication unit 2 is provided with the appropriate (e.g., preferred) action a associated with the policy π for the state s occurring in the work area 8. The interface communication unit 2 can then wirelessly communicate the appropriate action a to the vehicle 6 in the work area 8 so the vehicle 6 may meet the schedule to achieve the goal. In one embodiment, the operator in the vehicle 6 receives the appropriate action a as a dispatch and operates the vehicle 6 accordingly. In another embodiment in which the vehicle 6 is autonomous or substantially autonomous, the interface communication unit 2 instructs/controls the vehicle 6 to perform the appropriate action a.

Figure 2:
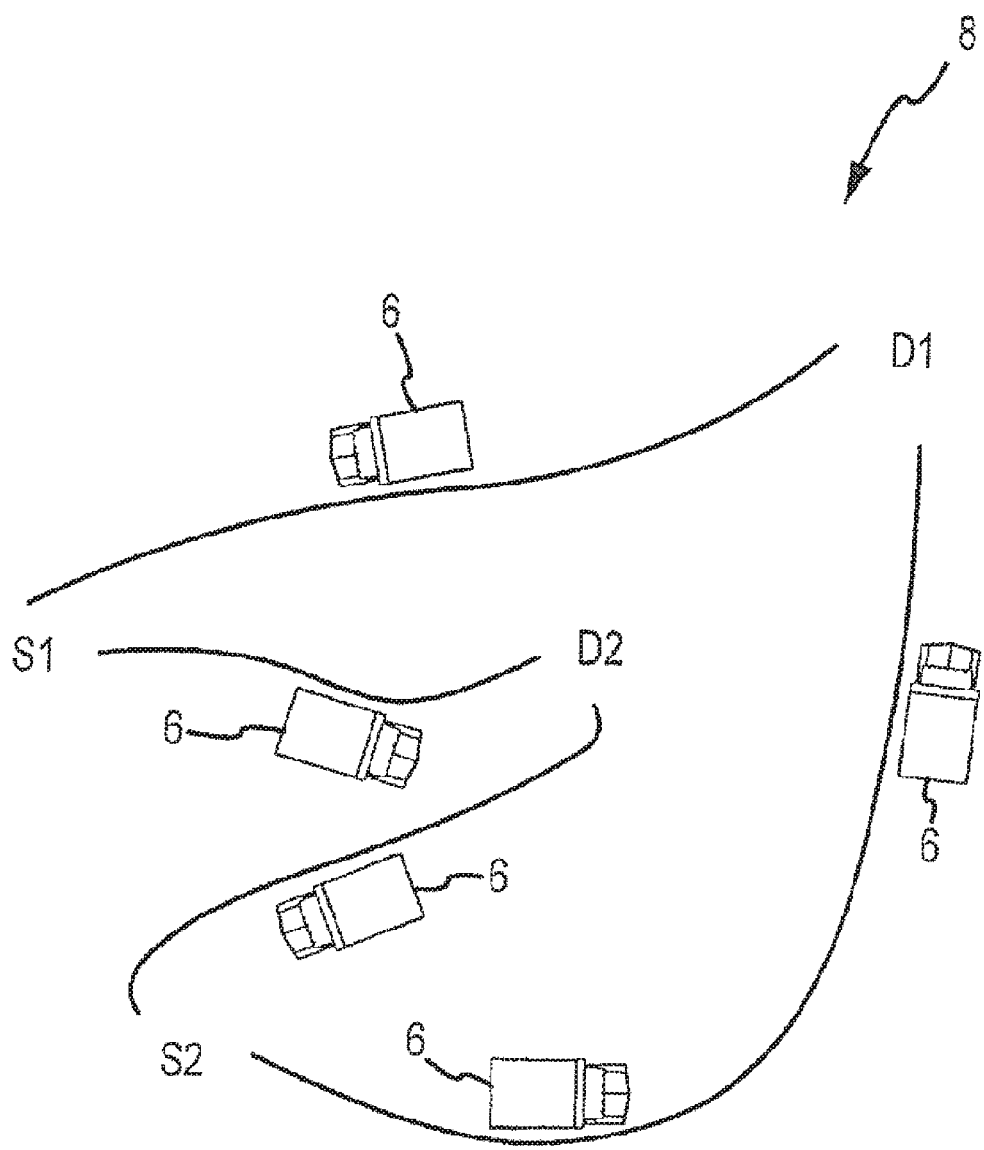
FIG. 2 is a diagram of a work area in which vehicles are dispatched.

The method 30 can be used to advantage when illustrated in the example shown in FIG. 2. Work area 8 has two source locations S1, S2 and two destination locations D1, D2 and the option of using up to five vehicles 6. It takes 2.5 minutes to load at source location S1 and 1.8 minutes to load at source location S2. It takes three minutes to unload at destination location D1 and four minutes at destination location D2. Loads from source location S1 can only be unloaded at destination location D2 because they are of the same material type. The same material constraint applies for loads from S2 as they are only able to be unloaded at D1. In this example, the linear programming selected the use of five vehicles 6, all of the same class and having a haul capacity of 100 tons and an average velocity of 10 m/s. However, in another embodiment, the linear programming could select vehicles 6 from more than one class wherein the classes may be differentiated based on haul capacities, velocities or other factors defined by the particular work environment.

Simulations of the reinforcement learning were run with episode lengths of one, two, and three hours. When the results (i.e., tons hauled), of each of a local search method and the reinforcement learning aspect of method 30 were averaged, the results were consistent over the different episode lengths. Thus, regardless of the episode length, it was demonstrated that the reinforcement learning's ratio of performance, i.e., the ratio of reinforcement learning performance over the local search method performance, over the local search method was considerable.

Tests were also performed to evaluate disturbances in the reinforcement learning's simulation represented as an entropy value. The larger the entropy value, the more disturbances occur. The simulation episode had a length of one hour with different entropy values of 0, 5, 10, 15, and 20. The results showed that even with disturbances, the reinforcement learning still performed better, i.e., more tons hauled, than the local search method. Since linear programming takes place before simulation episodes begin, linear programming cannot account for disturbances in the system.

A further advantage of the present invention is that the reinforcement learning, and therefore the learning of the best policies π, can take place offline. The Monte Carlo reinforcement learning method was used in the above example. Similar results (tons hauled) occurred with policies π that were learned both with disturbances and without. Thus, the reinforcement learning can take place offline and disturbances can be simulated with success. This is most advantageous because reinforcement learning and therefore policy learning can be done 5,000-30,000 times faster than a real-time/real-world or non-simulation method.

The present invention provides many advantages over commonly used vehicle dispatch systems and methods. The present invention balances the trade-offs between a great many factors, such as percentage constraints on materials, as well as minimum and maximum capacity constraints at source and destination locations. Furthermore, the present invention adapts quickly to changes in work area 8 such as a source or destination location S1, S2, D1 or D2 being closed or reopened. Most advantageously, when implementing reinforcement learning, the vehicle dispatch system 1 and method 30 of the present invention are not constrained by fixed time intervals. The present invention implements policies for addressing major environmental changes, such as changes in source location S1, S2, vehicle 6 break downs or repairs. The reinforcement learning technique also can factor in vehicles 6 coming from different locations that affect wait times. In mining, information needs to be updated constantly because continuous vehicle routing/dispatching environments are dynamic. Thus, the present invention provides for continuously updating policies and the actions associated with the policies via simulation and reward assignments.

The present invention optimizes multiple parameters by balancing those which may be in conflict. Optimization parameters, for example, may include flow rates, tons/hour, blending requirements (hauling a certain percentage of each material type hauled, not merely maximizing the total amount of material hauled), shortest path of travel, minimal number of trucks and source locations, minimal source location wait times, minimal destination wait times, minimal vehicle wait times, etc.

Since the present invention achieves flexibility, the invention may be adapted to use in many diverse applications such as military maneuvers (converge on location, exploration, mine disposal, recognizance), agriculture (dispatch multiple grain carts, multiple tractors, etc.), transportation (dispatching taxi cabs, buses, trains, subways, airlines, etc.), dispatching and fleet management of police and emergency vehicles, car rentals, open-pit mining, underground mining, postal services, general traffic control, whole systems (pit-to-port), freight systems, road construction, commercial or government vehicle fleets, cleaning of buildings (windows, floors, etc.), airport carts, NASA applications, and map building.

The vehicle dispatch system 1 and method 30 are also designed so that they can be easily adapted and modified for different work environments (e.g. work area 8). The state representation S is set up in such a way that it can handle many different types of vehicle routing problems. The vehicle dispatch system 1 and method of the present invention can work with many vehicle routing problems. However, the present invention should not be viewed as being limited to vehicle dispatching. It will be apparent to one of skill in the art after becoming familiar with the teachings of the present invention that, by providing a different set of equations and optimization parameters to the linear programming, the present invention can be used to solve other problems not related to vehicle dispatching, as long as the problem deals with scheduling. The novel systems and methods of the present invention comprising linear programming and reinforcement learning can be used for any problem given the proper constraints, optimization function and/or schedule as input. Thus, it is possible that the reinforcement learning and linear programming of the present invention can be applied to other problems as long as the output of the linear programming can be adapted as the state representation S for the reinforcement learning.

In understanding the scope of the present invention, the term "comprising" and its derivatives, as used herein, are intended to be open-ended terms that specify the presence of the stated features, elements, components, groups, and/or steps, but do not exclude the presence of other unstated features, elements, components, groups, and/or steps. The foregoing also applies to words having similar meanings such as the terms, "including", "having" and their derivatives. The terms of degree such as "substantially", "about" and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components disclosed herein can be changed as needed and/or desired. Components or units that are shown directly connected to each other can have intermediate structures disposed between them. The functions of two or more elements or units can be performed by one, and vice versa. The structures, steps and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A non-transitory computer-readable medium comprising instructions stored thereon, that when executed by one or more processors, perform the steps of:
   generating an autonomous vehicle schedule for a plurality of autonomous vehicles in a dynamic work area, wherein the autonomous vehicle schedule comprises a number of trips to be traveled along each path between one or more source locations and one or more destination locations;
   creating a state representation of the autonomous vehicle schedule, the state representation comprising an array including a plurality of possible states of each autonomous vehicle in the dynamic work area, each of the plurality of possible states comprising a plurality of possible actions of the corresponding autonomous vehicle;
   storing the state representation of the autonomous vehicle schedule;
   simulating each of the plurality of possible actions for each of the plurality of possible states during an episode before at least one of the possible states has occurred in the real world by selecting an action of the plurality of possible actions for each of the plurality of possible states to produce a result based on proximity to optimum performance of the plurality of autonomous vehicles within the dynamic work area;
   determining a reward value for each of the plurality of possible actions;
   propagating the reward value for each of the plurality of possible states back through simulation of the possible states with reference to time between the possible states;
   storing the reward value for each of the possible actions;
   storing a policy linked to one of the possible actions for each of the possible states;
   receiving communications from at least one of the autonomous vehicles regarding the current state of the dynamic work area; and
   communicating the action from the policy based on the current state of the dynamic work area to one or more of the autonomous vehicles in the dynamic work area to cause the one or more of the autonomous vehicles to perform in accordance with the action.

2. The non-transitory computer-readable medium of claim 1, wherein simulating the possible states during an episode comprises simulating the possible states continuously to maximize the reward value of the actions in each possible state.

3. The non-transitory computer-readable medium of claim 1, further comprising determining a maximum policy value using an elapsed time in the episode;
   wherein storing the policy comprises linking the policy to a maximum policy value for an action for each possible state.

4. The non-transitory computer-readable medium of claim 3, wherein determining the maximum policy value further comprises using a subsequent possible state with a subsequent action in the episode.

5. The non-transitory computer-readable medium of claim 3, wherein storing the policy comprises storing the action within each possible state that results in the maximum possible policy value as the policy for that possible state.

6. The non-transitory computer-readable medium of claim 1, wherein generating the schedule comprises executing linear programming using an optimization function, an environmental constraint, and a vehicle constraint as inputs.

7. The non-transitory computer-readable medium of claim 1, wherein:
- storing the reward value for each of the possible actions comprises storing the reward value for each of the possible states in a Q table; and
- storing the policy comprises storing the policy in the Q table.

8. The non-transitory computer-readable medium of claim 1, wherein simulating the possible states during an episode comprises continuously simulating the possible states during the episode to continuously determine the reward value for the selected action.

* * * * *